United States Patent [19]
Boumarafi et al.

[11] Patent Number: 5,588,671
[45] Date of Patent: Dec. 31, 1996

[54] RESEALABLE TEAR SEAM FOR SEAT DEPLOYED SIDE IMPACT AIR BAG

[75] Inventors: Mohamed Boumarafi, Rochester Hills; Jonathan P. Hurford, Lake Orion; William V. Collier, Milford, all of Mich.; Ralph Lichlyter, Danridge, Tenn.

[73] Assignee: Takata, Inc., Auburn Hills, Mich.

[21] Appl. No.: 531,517

[22] Filed: Sep. 21, 1995

[51] Int. Cl.⁶ .................................................. B60R 21/22
[52] U.S. Cl. ................................. 280/730.2; 280/728.3
[58] Field of Search .......................... 280/728.3, 730.2, 280/733, 730.1, 728.1

[56] References Cited

U.S. PATENT DOCUMENTS

| | | | |
|---|---|---|---|
| 3,887,214 | 6/1975 | Brawn | 280/730.1 |
| 4,946,191 | 8/1990 | Putsch | 280/733 |
| 5,062,662 | 11/1991 | Cameron | 280/733 |
| 5,161,819 | 11/1992 | Rhodes, Jr. | |
| 5,352,144 | 10/1994 | Kuhn | 446/176 |
| 5,447,326 | 9/1995 | Laske et al. | 280/730.2 |
| 5,474,323 | 12/1995 | Davidson | 280/728.2 |

FOREIGN PATENT DOCUMENTS 4-50052  2/1992  Japan .................................. 280/730.2

OTHER PUBLICATIONS

Research Disclosure No. 373, The International Journal for companies seeking an alternative or supplement to obtaining patents May 1995.

*Primary Examiner*—Paul N. Dickson
*Attorney, Agent, or Firm*—Harness, Dickey & Pierce, P.L.C

[57] ABSTRACT

A vehicle seat having a resealable tear seam through which a seat deployed side impact air bag is deployed during a side impact collision wherein the air bag expands causing the resealable tear seam to open and allowing the air bag to expand outside of the vehicle seat. The resealable tear seam comprises a first and a second seam member, preferably plastic locking fasteners, configured to form a resealable interlocking bond. The seam members elastically deform when forming the bond and when opening along the bond and return to an undeformed state after the bond forms or opens. The seam may be easily opened to install or service the air bag module and after installation or service is complete the interlocking bond may be easily reformed.

20 Claims, 7 Drawing Sheets

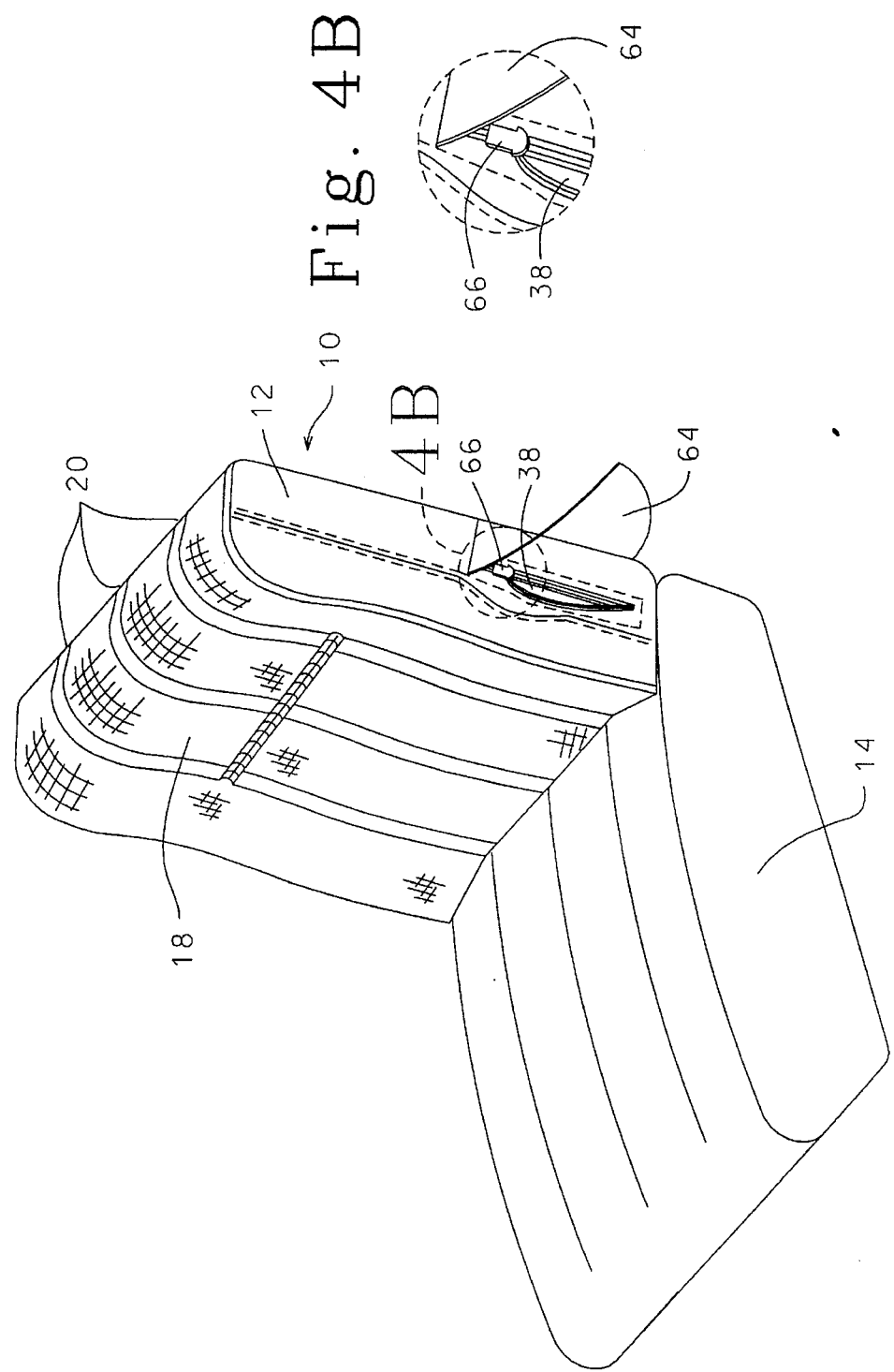

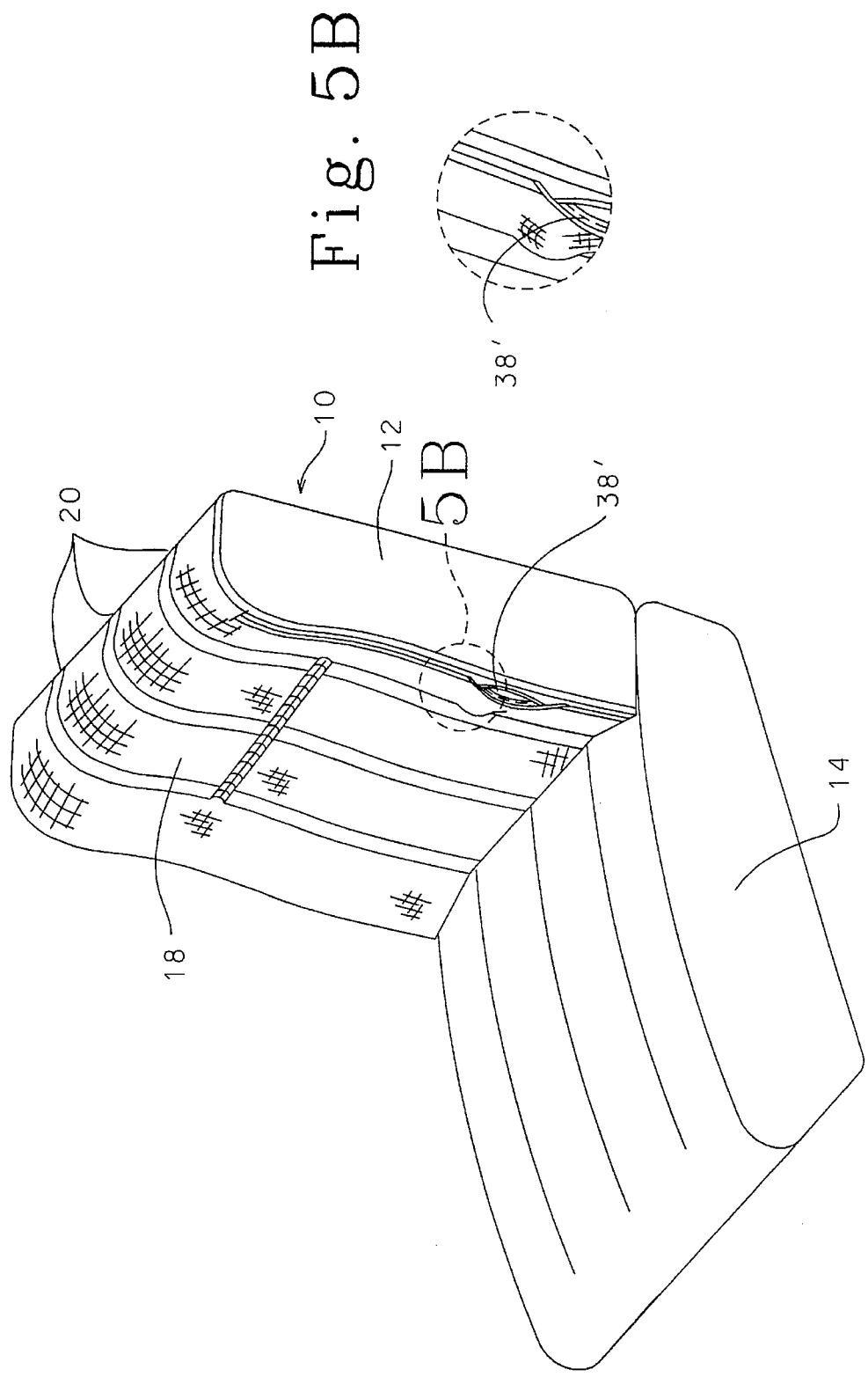

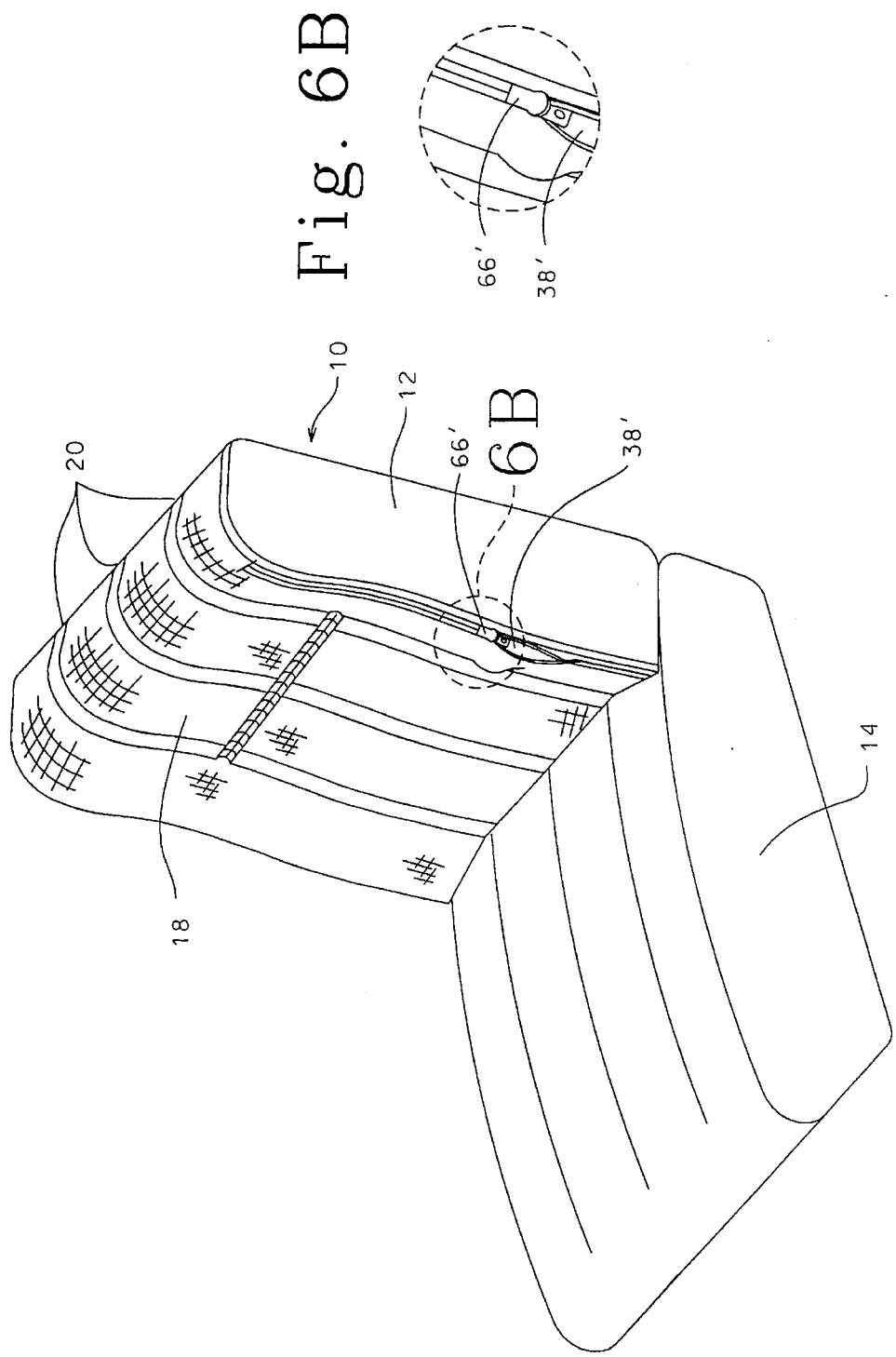

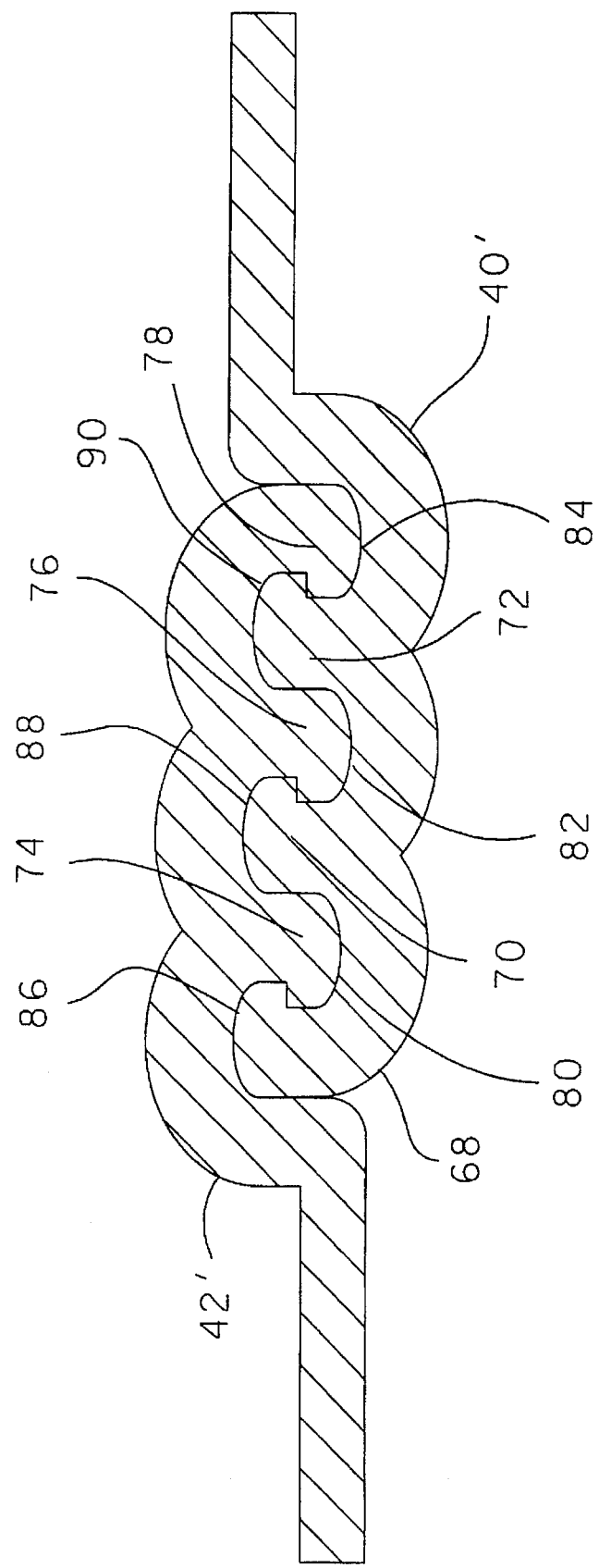

RESEALABLE TEAR SEAM FOR SEAT DEPLOYED SIDE IMPACT AIR BAG

FIELD OF THE INVENTION

The present invention relates to side impact air bags. More particularly, the present invention relates to vehicle seats having a resealable tear seam for seat deployed side impact air bags.

BACKGROUND OF THE INVENTION

Inflatable restraint systems are now commonly utilized in motor vehicles as passive occupant restraint devices for impact protection. The air bag of an inflatable restraint system inflates during a collision in response to an electrical signal generated from one or more crash sensors mounted to the motor vehicle. The inflated air bag provides energy absorption and an improved contact surface for motor vehicle occupants in the event of a crash.

Side impact air bag systems have been developed which deploy during side impact collisions. Generally, side impact air bags are housed in the vehicle seat or in an inner surface of the vehicle door. Air bags housed in the vehicle seat are typically deployed through a tear seam in the seat cover material.

The timing of a side impact air bag system is very critical to the success of the cushioning device. For a typical side impact, the air bag system must sense the crash and deploy the air bag within 10–15 ms. Therefore, any delay in the deployment of the air bag could cause a decrease in the amount of protection given by the air bag device.

A conventional vehicle seat having a seat deployed side impact air bag has a sewn tear seam located on the seat cover. In order for the air bag to properly deploy, the seat cover seam should separate in a predictable manner. However, a sewn tear seam can act unpredictably during air bag deployment. Such factors as the type of material used on the seat cover, the type of thread used to sew the seam and the type of stitch used all add to the unpredictability of the sewn tear seam. Therefore, it is possible that air bag deployment may be delayed or even prevented during a side impact crash due to the unpredictability of the sewn seam.

Another disadvantage of using a sewn tear seam is that it is not reusable. When the air bag is deployed, the seat cover is damaged and either the seat or seat cover must be replaced or the seam must be resewn. This results in a high average repair cost (ARC) which generally leads to higher insurance premiums. Furthermore, if the tear seam is resewn, the unpredictability of the tearing characteristics of the repaired seam increases.

Servicing the air bag module also presents a problem. Because servicing the air bag module generally results in damage to the seat cover and seam, the seam must be resewn. This presents problems similar to those mentioned above.

Vehicle seats having a sewn tear seam also present manufacturing problems for the vehicle manufacturer. The vehicle manufacturer is required to use vehicle seats which have been previously assembled to include the seat deployed air bag modules or sew over the tear seam on the assembly line after the air bag module has been installed in the seat. This results in higher manufacturing costs and increased assembly time.

Thus, there is a need for a vehicle seat tear seam for seat deployed side impact air bags which acts in a predicable manner during air bag deployment. There is also a need for a vehicle seat tear seam which can be resealed after an air bag deployment thus lowering the average repair cost. There is a further need for a resealable vehicle seat tear seam which would facilitate easy service and maintenance of a seat deployed air bag module contained within the vehicle seat without damaging the vehicle seat cover. There is a still further need for a vehicle seat tear seam which would allow vehicle manufacturers to easily install air bag modules into vehicle seats during vehicle manufacturing.

SUMMARY OF THE INVENTION

The present invention provides a vehicle seat having a resealable tear seam through which a seat deployed side impact air bag is deployed during a side impact collision wherein the air bag expands causing the resealable tear seam to separate and allowing the air bag to expand outside of the vehicle seat providing an improved contact surface for the vehicle occupants.

One object of the present invention is to provide a reliable vehicle seat tear seam for seat deployed side impact air bags which acts in a predicable manner during air bag deployment.

It is another object of the present invention to provide a vehicle seat tear seam which can be resealed after an air bag deployment thus lowering the average repair cost.

It is still another object of the present invention to provide a resealable vehicle seat tear seam which would facilitate easy service and maintenance of a seat deployed air bag module contained with the vehicle seat without damaging the vehicle seat cover.

It is a further object of the present invention to provide a vehicle seat tear seam which would allow vehicle manufacturers to easily install air bag modules into vehicle seats during vehicle manufacturing.

In order to achieve the foregoing objects, the present invention provides a vehicle seat having an internal seat frame and an external seat covering. A seat deployed air bag module is contained within the seat and is covered by the seat covering. The air bag is deployed through a resealable seam in the seat covering so that when the air bag is inflated during deployment, the air bag is forced to expand causing the resealable seam to separate and allowing the air bag to expand outside of the vehicle seat.

The resealable tear seam includes a first seam member configured to form a resealable interlocking bond with a second seam member. The seam members are configured to elastically deform when forming the interlocking bond and when opening along the interlocking bond. They are further configured to return to their original undeformed state after the bond forms or opens. In the preferred embodiment, the first and second seam members are plastic locking fasteners which lock together to form the interlocking bond.

A slider can be provided which is carried by the first and second seam members. The slider is used to assist in opening or closing the seam by sliding the slider along the length of the seam creating or breaking the interlocking bond similar to the slider of a common zipper.

The resealable tear seam can be located on a forward portion of the seat back in an area where a common sewn seam may be located or it can be located on a side portion of the seat and covered with an overlapping section of material so as not to disturb the aesthetic appearance of the seat.

In an alternative embodiment, a vehicle seat cover is provided including sections of material configured to cover a vehicle seat, the seat cover further including a resealable tear seam as disclosed with respect to the vehicle seat described above.

Further objects, features and advantages of the invention will become apparent from a consideration of the following description and the appended claims when taken in connection with the accompanying drawings.

BRIEF DESCRIPTION OF THE DRAWINGS

FIG. 4A is a perspective view of a vehicle seat having a resealable tear seam, slider and overlapped fabric located on a side section of the seat;

FIG. 4B is an exploded sectional view of the resealable tear seam, slider and overlapped fabric of FIG.4A;

FIG. 5A is a perspective view of a vehicle seat having a resealable tear seam located on a forward section of the seat;

FIG. 5B is an exploded sectional view of the resealable tear seam of FIG. 5A;

FIG. 6A is a perspective view of a vehicle seat having a resealable tear seam and slider located on a forward section of the seat;

FIG. 6B is an exploded sectional view of the resealable tear seam and slider of FIG. 6A;

FIG. 7 is a latitudinal cross-sectional view of an alternative embodiment of the resealable tear seam.

DETAILED DESCRIPTION OF THE PREFERRED EMBODIMENT

Figure 1:
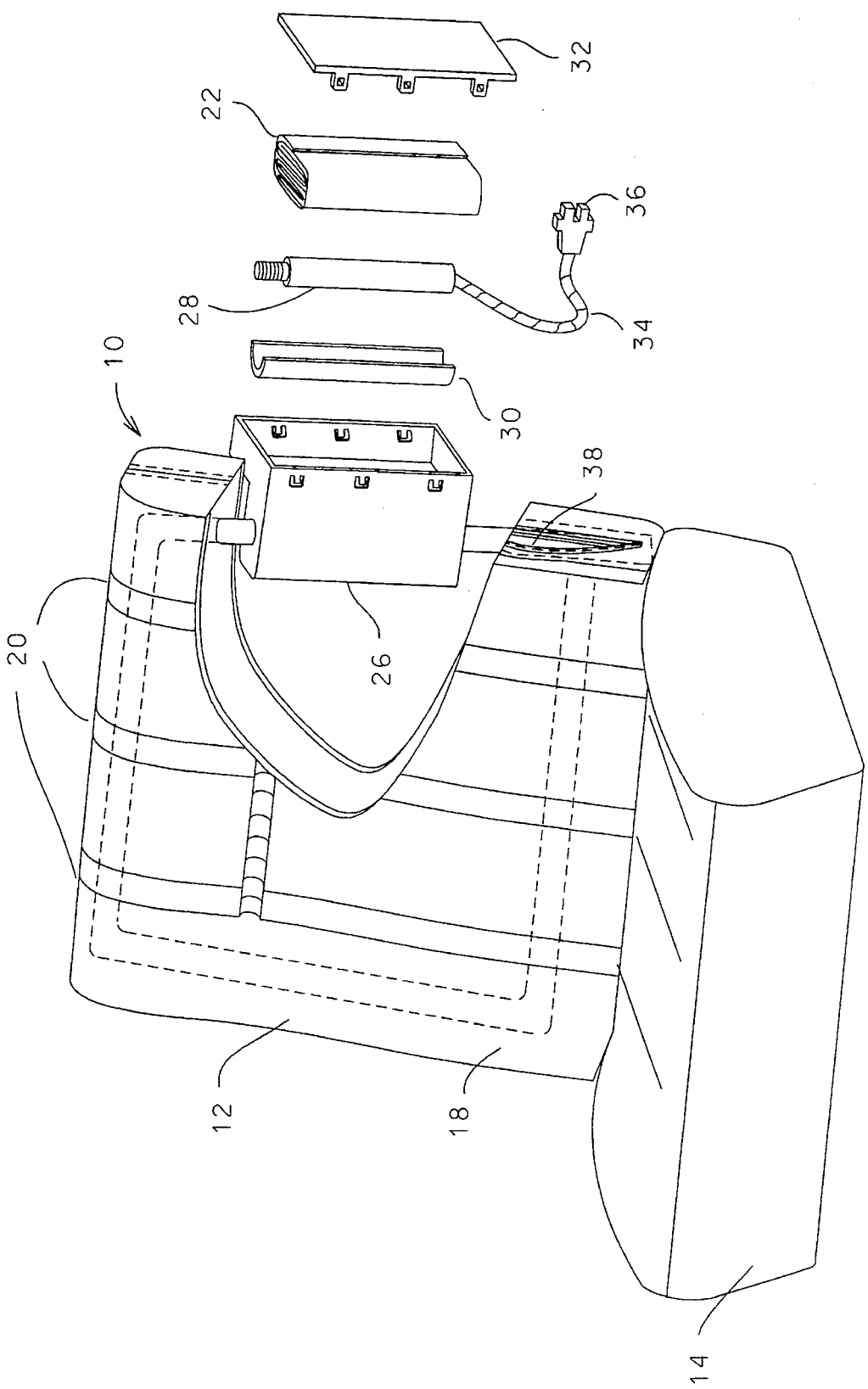
FIG. 1 is a perspective view of a vehicle seat provided with a side impact air bag module depicted in exploded view for deployment through a resealable tear seam located in a side portion of the seat.
Figure 2:
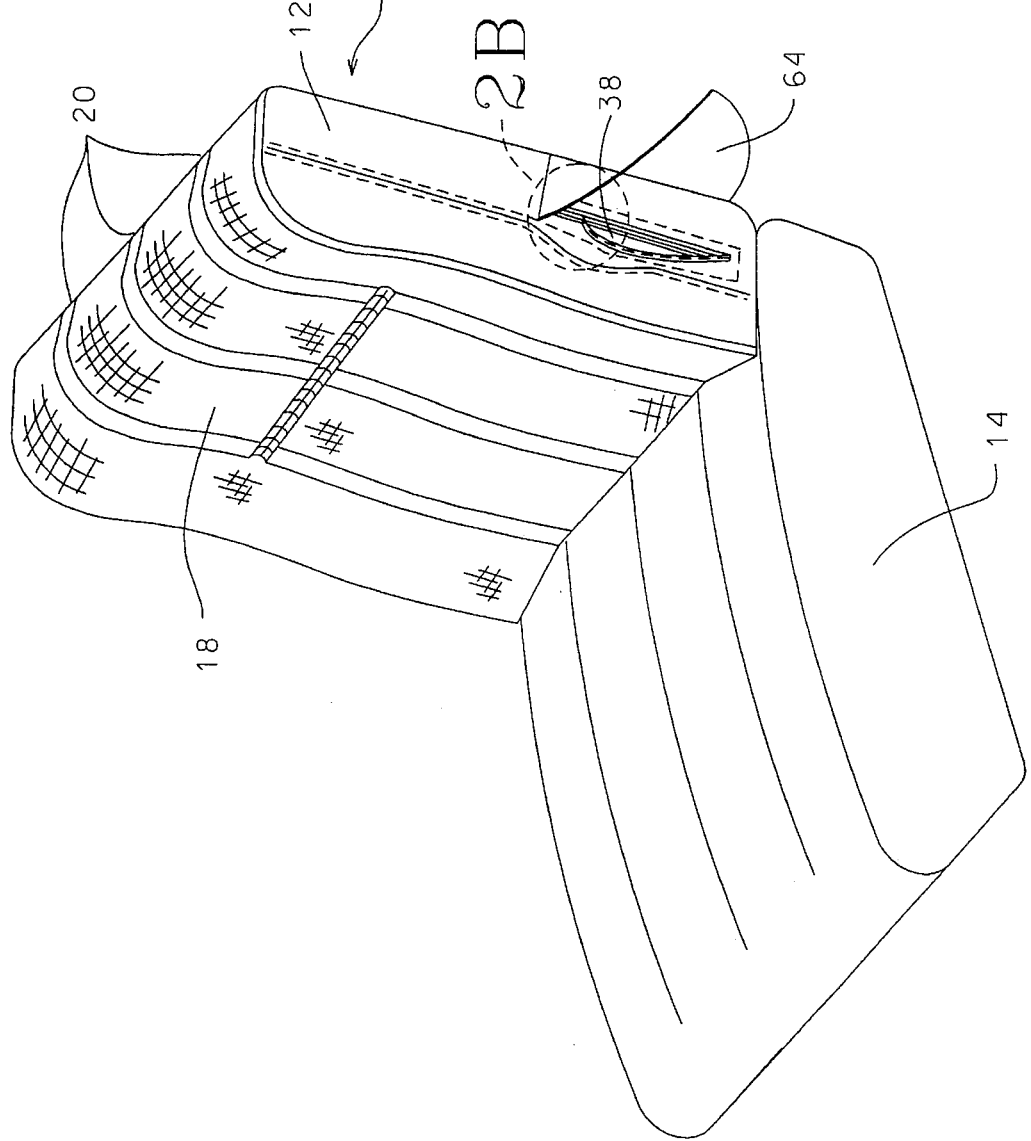
FIG. 2A is a perspective view of a vehicle seat having a resealable tear seam and overlapped fabric located on a side section of the seat.
FIG. 2B is an exploded sectional view of the resealable tear seam and overlapped fabric of FIG. 2A.
Figure 3:
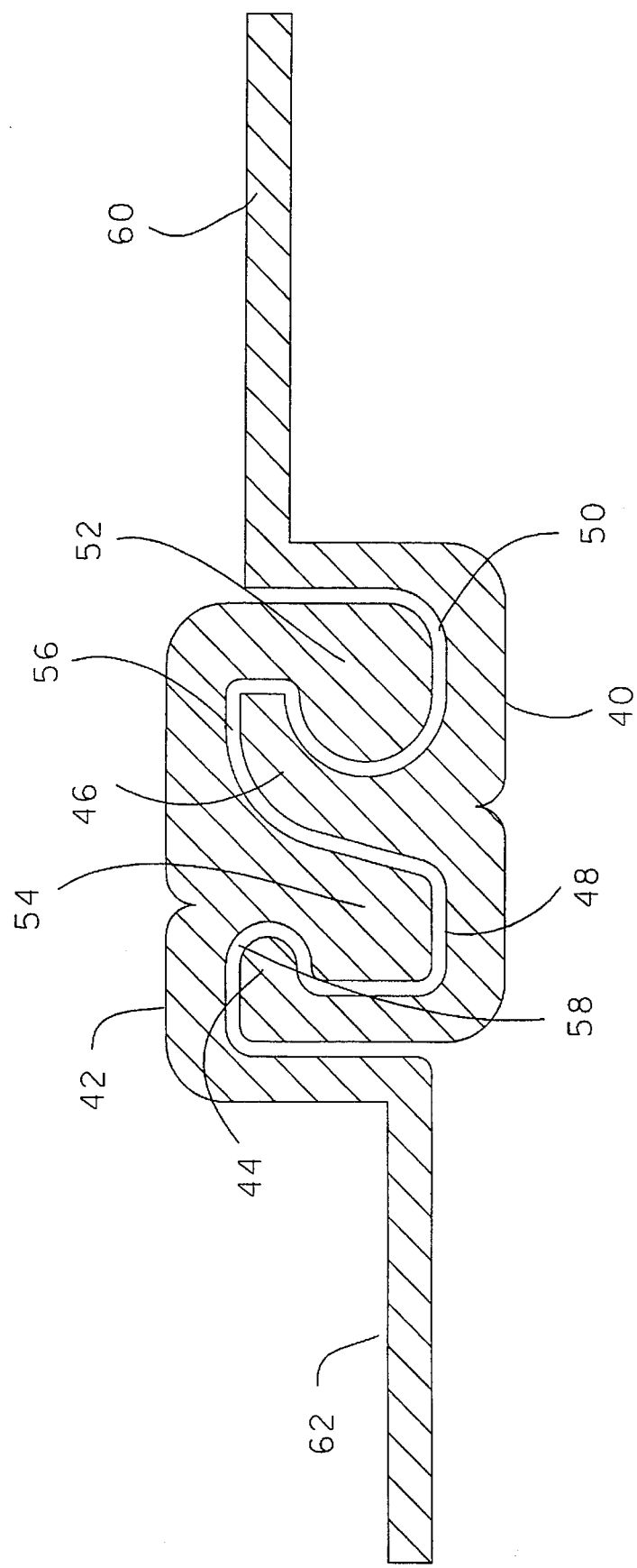
FIG. 3 is a latitudinal cross-sectional view of the resealable tear seam of FIG. 2A.

Preferred embodiments of the resealable tear seam for seat deployed side impact air bags are described herebelow with reference to the drawings.

Referring to FIGS. 1, 2A, 2B, 3, 4A and 4B, the vehicle seat, indicated generally at 10, includes a seat back 12 and a seat bottom 14. The seat 10 has an internal frame 16 and a covering 18 made of sections of cloth, leather or some other similar material having qualities which add to the comfort and aesthetic appearance of the vehicle interior. The covering 18 is fitted to cover the seat frame 16 and includes functional and decorative seams 20 which connect the sections of material and which are designed to provide comfort and further add to the aesthetic appearance of the seat 10.

An air bag module suitable for housing a side impact air bag 22 is shown in an exploded pictorial fashion in FIG. 1 and is designated there by reference number 24. As shown, module 24 is structurally mounted to the seat 10 by affixing a module housing 26 to the seat frame 16 with threaded fasteners (not shown) such that the module 24 is recessed inside the assembled seat 10 within the seat back foam cushion. An inflator 28 is received by the module housing 26 and provides generated gases which inflate the air bag 22. In order to retain the air bag 22, a retainer 30 is trapped between the inflator 28 and the housing 26 in a manner which engages a pair of flaps (not shown) on the air bag 22. A deployment cover 32 is provided on the housing 26 so as to facilitate pre-assembly of the entire module 24. The deployment cover 30 is snapped into the housing 26 and contains a tear seam through which the air bag is deployed. An electrical cable 34 and connector 36 extend from the inflator 28 through the housing 26. The cable 34 and connector 36 carry electric signals from crash sensors (not shown) which activate air bag deployment upon sensing a side-impact collision. A resealable tear seam 38 is provided on the seat cover and is designed to open upon inflation of the air bag 22, allowing deployment of the inflating air bag 22 in response to the electrical crash signal from the appropriate sensor (not shown).

The resealable tear seam 38, located on a side section of the seat 10, comprises a first and a second seam member, 40 and 42 respectively, which are configured to form a resealable interlocking bond. The first seam member 40 includes a pair of arm members, 44 and 46, which together form a pair of female connectors, 48 and 50. The second seam member 42 also includes a pair of arm members, 52 and 54, which also form a pair of female connectors, 56 and 58. The arm members 44, 46 of the first seam member 40 are configured to mate with the female connectors 56, 58 of the second seam member and the arm members 52, 54 of the second seam member 42 are configured to mate with the female connectors 48, 50 of the first seam member to form an interlocking bond. The seam members each include a wing 60, 62 which is used to secure the seam members 40, 42 into the resealable tear seam 38 on the covering 18 of the vehicle seat 10.

The seam members 40, 42 are configured to elastically deform when forming the interlocking bond or when opening along the interlocking bond. Furthermore, the seam members 40, 42 are configured to return to their undeformed state after the bond has formed or opened. Preferably, the seam members are plastic locking fasteners, however hook and loop fasteners sold under the trademark VELCRO by Velcro U.S.A., Inc., Manchester, N.H. or other similar locking fasteners may be used.

Through elastic deformation, the interlocking bond can be opened and closed without damage to the seam members 40, 42 or seat covering 18. Furthermore, the seam may be resealed without the use of special tools. An overlapped section of material 64 can also be provided for covering the resealable tear seam 38 to protect the seam 38 from tampering and to add to the aesthetic appearance of the seat 10.

In an alternative embodiment, a slider 66 can be provided for manually opening and closing the resealable tear seam 38. The slider 66 is carried by the first and second seam members 40, 42 and is configured to close the seam 38 by forcing the arm members 44, 46 of the first seam member 40 to elastically deform into the female connectors 56, 58 of the second seam member 42 and similarly forcing the arm members 52, 54 of the second seam member 42 to elastically deform into the female connectors 48, 50 of the first seam member 40 when the slider 66 is moved along the length of the seam 38 in a first direction. This forms an interlocking bond between the seam members 40, 42. The slider 66 is also configured to open the seam 38 by forcing the arm members 44, 46, 52 and 54 to elastically deform and withdraw from the female connectors 48, 50, 56 and 58 when the slider 66 is moved in a second direction, opposite the first direction, thus breaking the bond between the seam members 40,42.

In yet another embodiment, as illustrated in FIGS. 5A, 5B, 6A, and 6B the resealable tear seam 38' can be located in a forward portion of the seat 10. In this embodiment, the air bag module 24 is mounted to the seat 10 and configured to inflate the air bag 22 causing seam 38' to open and allowing deployment of the air bag 22. A slider 66' can also be included on the forward resealable tear seam 38' for opening and closing the seam 38'

FIG. 7 shows an alternative embodiment of the resealable tear seam wherein the first and second seam members 40', 42' each have three arm members 68, 70, 72, and 74, 76, 78 and three female connectors 80, 82, 84, and 86, 88, 90. It is contemplated that the number and shape of the arm members and female connectors used to accomplish the resealable seam could vary without departing from the spirit of the invention.

It is to be understood that the invention is not limited to the exact construction illustrated and described above, but that various changes and modifications may be made without departing from the spirit and scope of the invention as defined in the following claims.

We claim:

1. A vehicle seat apparatus comprising:

an internal seat frame;

an external covering; and a seat deployed air bag contained within said seat and covered by said covering wherein said air bag is deployed through a resealable seam in said covering, said seam having a first seam member having at least two arm members which together form at least two female connectors configured to form a resealable interlocking bond with a second seam member having at least two arm members which together form at least two female connectors, wherein said first member at least two arm members engage said second member at least two female connectors and said second member at least two arm members engage said first member at least two female connectors to form said resealable interlocking bond, said air bag being inflated during deployment forcing said air bag to expand thus causing said interlocking bond to open along said seam allowing said air bag to expand outside of the vehicle seat.

2. A vehicle seat apparatus according to claim 1 wherein said first and second seam members elastically deform when forming said interlocking bond and when opening along said interlocking bond and return to an undeformed state after said bond forms or opens.

3. A vehicle seat apparatus according to claim 2 wherein said first and second seam members are plastic locking fasteners configured to interlock to form said resealable interlocking bond.

4. A vehicle seat apparatus according to claim 2, further comprising:

a slider carried by said first and second seam members for manually opening said seam by breaking said bond between said first and second seam members when said slider is moved along said seam in a first direction and for manually closing said seam by interlocking said first and second members when said slider is moved along said seam in a second direction.

5. A vehicle seat apparatus according to claim 1, wherein said seat further comprises a seat back and said seam is located on a forward portion of said seat back.

6. A vehicle seat apparatus according to claim 1, wherein said seat further comprises a seat back and said seam is located on a side portion of said seat back.

7. A vehicle seat apparatus according to claim 6, further comprising:

an overlapped section of material covering said seam.

8. A vehicle seat apparatus according to claim 5, further comprising:

a slider carried by said first and second seam members for manually opening said seam by breaking said bond between said first and second seam members when said slider is moved along said seam in a first direction and for manually closing said seam by interlocking said first and second members when said slider is moved along said seam in a second direction.

9. A vehicle seat apparatus according to claim 6, further comprising:

a slider carried by said first and second seam members for manually opening said seam by breaking said bond between said first and second seam members when said slider is moved along said seam in a first direction and for manually closing said seam by interlocking said first and second members when said slider is moved along said seam in a second direction.

10. A vehicle seat apparatus according to claim 7, further comprising:

a slider carried by said first and second seam members for manually opening said seam by breaking said bond between said first and second seam members when said slider is moved along said seam in a first direction and for manually closing said seam by interlocking said first and second members when said slider is moved along said seam in a second direction.

11. A vehicle seat cover for covering a vehicle seat having a seat deployed air bag, the seat cover comprising:

sections of material configured to cover the vehicle seat, said sections being connected at seams, wherein the air bag is deployed through a resealable seam, said resealable seam having a first seam member having at least two arm members which together form at least two female connectors configured to form a resealable interlocking bond with a second seam member having at least two arm members which together form at least two female connectors, wherein said first member at least two arm members engage said second member at least two female connectors and said second member at least two arm members engage said first member at least two female connectors to form said resealable interlocking bond, the air bag being inflated during deployment causing said interlocking bond to open along said resealable seam allowing the air bag to expand outside of the vehicle seat.

12. A vehicle seat cover according to claim 11 wherein said first and second seam members elastically deform when forming said interlocking bond and when opening along said interlocking bond and return to an undeformed state after said bond forms or opens.

13. A vehicle seat cover according to claim 12 wherein said first and second seam members are plastic locking fasteners configured to interlock to form said resealable interlocking bond.

14. A vehicle seat cover according to claim 12, further comprising:

a slider carried by said first and second seam members for manually opening said resealable seam by breaking said bond between said first and second seam members when said slider is moved along said resealable seam in a first direction and for manually closing said resealable seam by interlocking said first and second members when said slider is moved along said resealable seam in a second direction.

15. A vehicle seat cover according to claim 11, wherein said resealable seam is located on a forward portion of a seat back of the vehicle seat.

16. A vehicle seat cover according to claim 11, wherein said resealable seam is located on a side portion of a seat back of the vehicle seat.

17. A vehicle seat cover according to claim 16, further comprising:

an overlapped section of material covering said resealable seam.

18. A vehicle seat cover according to claim 15, further comprising:

a slider carried by said first and second seam members for manually opening said resealable seam by breaking said bond between said first and second seam members when said slider is moved along said resealable seam in a first direction and for manually closing said resealable seam by interlocking said first and second members when said slider is moved along said resealable seam in a second direction.

19. A vehicle seat cover according to claim 16, further comprising:

a slider carried by said first and second seam members for manually opening said resealable seam by breaking said bond between said first and second seam members when said slider is moved along said resealable seam in a first direction and for manually closing said resealable seam by interlocking said first and second members when said slider is moved along said resealable seam in a second direction.

20. A vehicle seat cover according to claim 17, further comprising:

a slider carried by said first and second seam members for manually opening said resealable seam by breaking said bond between said first and second seam members when said slider is moved along said resealable seam in a first direction and for manually closing said resealable seam by interlocking said first and second members when said slider is moved along said resealable seam in a second direction.

* * * * *